(12) United States Patent
Ghoshal

(10) Patent No.: US 6,430,936 B1
(45) Date of Patent: Aug. 13, 2002

(54) PHOTONIC MICROHEATPIPES

(75) Inventor: Uttam Shyamalindu Ghoshal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/006,073

(22) Filed: Dec. 6, 2001

(51) Int. Cl.[7] ............................................. F25B 21/02
(52) U.S. Cl. ........................................................ 62/3.7
(58) Field of Search ......................... 62/3.2, 3.3, 3.7, 62/259.2; 165/80.2, 104.33

(56) References Cited

U.S. PATENT DOCUMENTS

| | | | |
|---|---|---|---|
| 5,447,032 A | 9/1995 | Epstein et al. | 62/3.1 |
| 5,615,558 A | 4/1997 | Cornell et al. | 62/56 |
| 5,963,680 A | 10/1999 | Kleinerman | 385/12 |
| 6,041,610 A | 3/2000 | Edwards et al. | 62/264 |
| 6,093,246 A * | 7/2000 | Lin et al. | 117/928 |
| 6,339,030 B1 * | 1/2002 | Constant et al. | 438/758 |

OTHER PUBLICATIONS

Andrianov, S. et al., "Laser Cooling of Solids", Optika I Spektroskopiya, vol. 84, No. 5, pp. 774–779, Abstract.

* cited by examiner

Primary Examiner—Denise L. Esquivel
Assistant Examiner—Melvin Jones
(74) Attorney, Agent, or Firm—Duke W. Yee; Casimer K. Salys; Stephen R. Loe

(57) ABSTRACT

An apparatus for transporting and rejecting heat energy is provided. In one embodiment, the heat transporter includes a photonic microheatpipe and a source of photons. The photonic microheatpipe is a photonic crystal that shows pronounced Raman effect and is thermally coupled to a heat source. Photonic crystals disallow certain frequencies of light from being transmitted through the crystal. When a photon scatters back from phonons (lattice vibrations) in the crystal, the properties of the reflected spectrum are governed by the Raman effect. The reflected spectrum have two pronounced components: a Stoke's line and an Anti-Stokes line. The Stokes lines correspond to frequencies that are the difference between the frequency of the incident photons and that of the phonons, while the anti-Stokes lines correspond to frequencies that are sum of the frequency of the incident photons and that of the phonons. According to the present invention, the photonic crystal is selected such that the Stokes lines are suppressed while the anti-Stokes lines are not attenuated. Hence the photons reflected from the photonic crystal have frequencies (and energy) greater than the incident photons. Thus, heat energy represented as acoustic phonons is transferred into photons. The photons corresponding to the anti-Stoke lines are transmitted through the photonic microheatpipe away from the heat source to a suitable point for rejecting the heat energy.

16 Claims, 2 Drawing Sheets

PHOTONIC MICROHEATPIPES

BACKGROUND OF THE INVENTION

1. Technical Field

The present invention relates to an apparatus, method, and system for transporting heat.

2. Description of Related Art

Refrigeration is the process of removing heat from an enclosed space or from a substance for the purpose of lowering the temperature. Refrigeration systems are important to many aspects of modern life. Common uses for refrigeration systems include refrigerators for preserving food, air conditioning systems for controlling the interior climate of homes and offices, systems for cooling engines such as for automobiles, and devices for cooling electronics such that the electronics performs optimally.

Typically, cooling systems are mechanical systems, such as, for example, simple fans for pulling heated air away from an area to be cooled, as used in many computers, or vapor-compression cooling as used for many household refrigerators and air-conditioning systems. In vapor-compression type cooling, a gas coolant, such as freon, is first compressed, usually by a piston, and then pushed through a tube into the condenser. In the condenser, the winding tube containing the vapor is passed through either circulating air or a bath of water, which removes some of the heat energy of the compressed gas. The cooled vapor is passed through an expansion valve to an area of much lower pressure; as the vapor expands, it draws the energy of its expansion from its surroundings or the medium in contact with it. Evaporators may directly cool a space by letting the vapor come into contact with the area to be chilled, or they may act indirectly—i.e., by cooling a secondary medium such as water. In most domestic refrigerators, the coil containing the evaporator directly contacts the air in the food compartment. At the end of the process, the hot gas is drawn toward the compressor.

In addition to mechanical coolers, solid state devices, such as thermoelectric coolers, are also utilized to cool devices. Due to current technological and economic constraints, these coolers are typically used only for electronics.

However, one problem with all current coolers is the inability of the system to efficiently transport and reject heat at distant locations. Usually, the heat is rejected to a fluidic system (such as air or circulating water), as discussed above, through heat fins, heat pipers, or heat exchangers. These systems have many limitations such as fluid leakages, acoustic noise, gravity dependent performance, and finite transport distances. Therefore, it would be desirable to have a system of heat transport that allows heat to be more efficiently transported over long distances and rejected at more distant locations than is currently possible with existing technology.

SUMMARY OF THE INVENTION

The present invention provides an apparatus and method for transporting and rejecting heat energy. In one embodiment, the heat transporter includes a photonic microheatpipe and a source of photons. The photonic microheatpipe is a photonic crystal that shows pronounced Raman effect and is thermally coupled to a heat source. Photonic crystals disallow certain frequencies of light from being transmitted through the crystal. When a photon scatters back from phonons (lattice vibrations) in the crystal, the properties of the reflected spectrum are governed by the Raman effect. The reflected spectrum have two pronounced components: a Stock's line and an Anti-Stokes line. The Stokes lines correspond to frequencies that are the difference between the frequency of the incident photons and that of the phonons, while the anti-Stokes lines correspond to frequencies that are sum of the frequency of the incident photons and that of the phonons. According to the present invention, the photonic crystal is selected such that the Stokes lines are suppressed while the anti-Stokes lines are not attenuated. Hence the photons reflected from the photonic crystal have frequencies (and energy) greater than the incident photons. Thus, heat energy represented as acoustic phonons is transferred into photons. The photons corresponding to the anti-Stoke lines are transmitted through the photonic microheatpipe away from the heat source to a suitable point for rejecting the heat energy.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
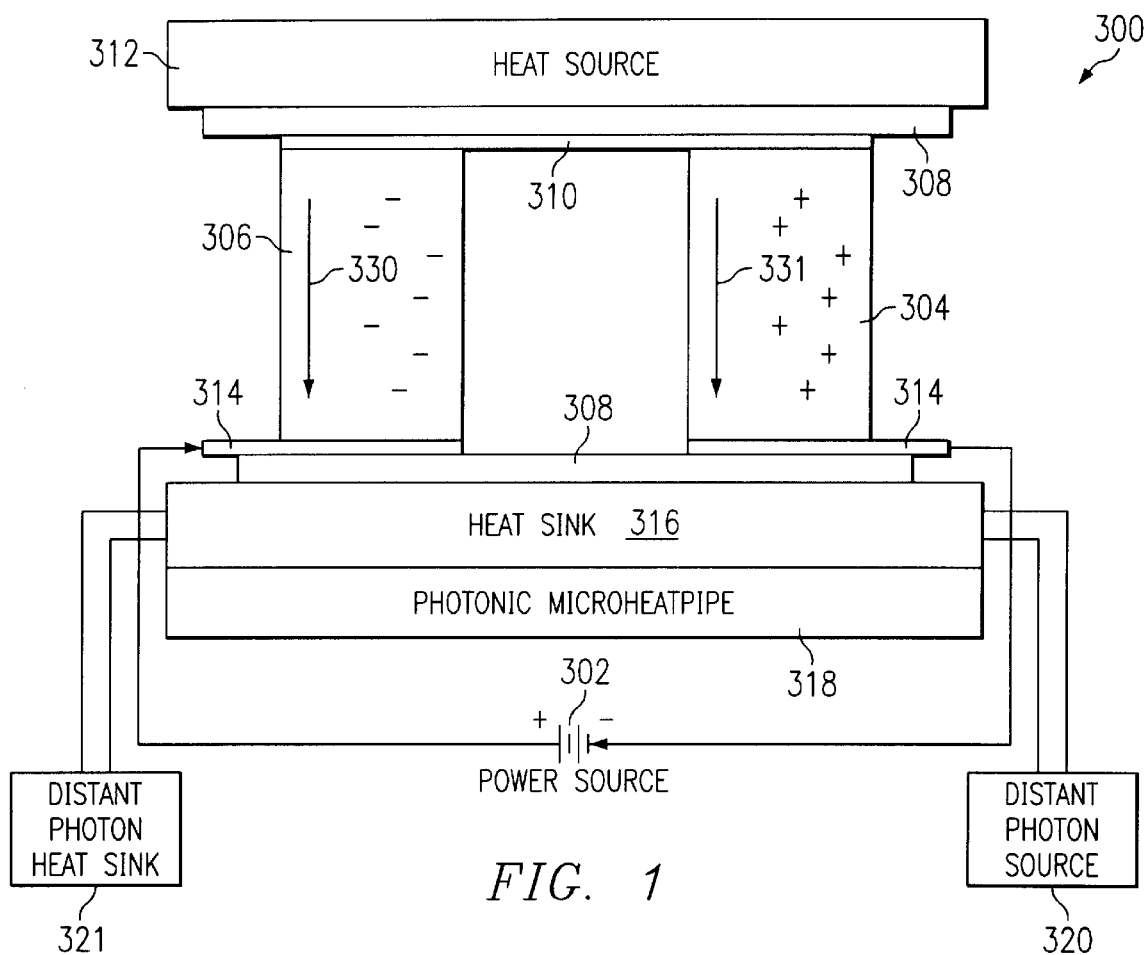
FIG. 1 a high-level block diagram of a Thermoelectric Cooling (TEC) device is depicted in accordance with the prior art.

With reference now to the figures and in particular with reference to FIG. 1, a high-level block diagram of a Thermoelectric Cooling (TEC) device is depicted in accordance with the prior art. A TEC device may be incorporated into data processing systems to cool components such as, for example, processors or selected regions of processor chips. Thermoelectric cooling, a well known principle, is based on the Peltier Effect, by which DC current from power source 302 is applied across two dissimilar materials causing heat to be absorbed at the junction of the two dissimilar materials. A typical thermoelectric cooling device utilizes p-type semiconductor 304 and n-type semiconductor 306 sandwiched between poor electrical conductors 308 that have good heat conducting properties. N-type semiconductor 306 has an excess of electrons, while p-type semiconductor 304 has a deficit of electrons.

As electrons move from electrical conductor 310 to n-type semiconductor 306, the energy state of the electrons is raised due to heat energy absorbed from heat source 312. This process has the effect of transferring heat energy from heat source 312 via electron flow through n-type semiconductor 306 and electrical conductor 314 to heat sink 316. The electrons drop to a lower energy state and release the heat energy in electrical conductor 314. The complementing effect occurs in p-type semiconductor 304 providing two paths of heat flow 330 and 331.

Often, the location of the heat sink 316 is not a convenient location to dissipate the heat removed from heat source 312. For example, there may be other components near neat sink 316 that are heat sensitive. Thus, in order to transport heat to an area in which heat dissipation is more appropriate, a photonic heatpipe 318 is thermally coupled to heat sink 316. A distant (physically residing far away) photon source 320 supplies photons to photonic heatpipe 318. Energy from the photons is absorbed in distant photon heat sink 321. Photonic heatpipe 318 is a photonic crystal and may be either a two dimensional crystal in which scattered light travels in any direction in a given plane, or the photonic crystal may be a two-and-a-half dimensional crystal in which light is constrained to the crystal and may only exit in either of two ends distal from one another. Photonic crystals disallow certain frequencies of light (or photons) from being transmitted as is well known in the art. By using photonic heatpipe 318, when photons are scattered from lattice points within the photonic heatpipe 318, the Raman effect, a well known phenomena, produces two additional frequencies of scattered photons in addition to the elastically scattered photons having a frequency equal to the incident photons. One of the frequencies is equal to the to the incident frequency minus a frequency related to the energy released by the incident photon to the phonons in the crystal (Stokes process). The other frequency of photons is equal to the incident frequency plus a frequency related to energy absorbed by the photon from phonons in the crystal (anti-Stokes process). However, by selecting the appropriate frequency of incident photons matched to an appropriate photonic crystal, the frequency of the Stokes process may be disallowed or significantly suppressed resulting in the anti-Stokes process dominating the inelastic scattering. Thus, rather than heating the crystal, heat from phonons may be converted into photons that may be transmitted through photonic heatpipe 318 to a distant heat sink 321 in which the elevated energy carried by the photons can be released or converted into heat energy and dissipated.

Figure 2:
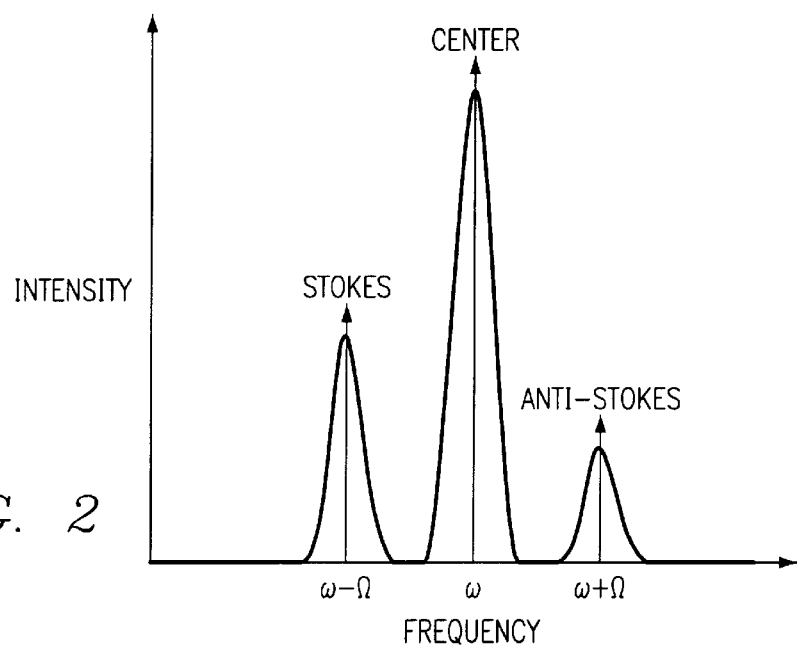
FIG. 2 depicts a graph illustrating intensity of scattered light in normal Raman scattering in accordance with a preferred embodiment of the present invention.

Referring now to FIG. 2, to aid in understanding Raman scattering, a graph illustrating intensity of scattered light in normal Raman scattering is depicted. Raman scattering involves two photons—one incident, one emitted. In the Raman effect, a photon is scattered inelastically by a crystal with an associated creation or annihilation of a phonon. The selection rules for the first-order Raman effect provide that the center frequency, $\omega$, of the incident photon is related to the frequency, $\omega'$ of the emitted photon by the following equation:

$$\omega = \omega' \pm \Omega;$$

where $\Omega$ is related to the energy of the phonon destroyed or created in the scattering event. In normal Raman scattering, the intensity of the Stoke's line is greater than the intensity of the anti-Stoke's line as depicted in FIG. 2. Such a situation results in the crystal being heated. Therefore, with many materials, Raman scattering is not consistent with cooling.

Figure 3:
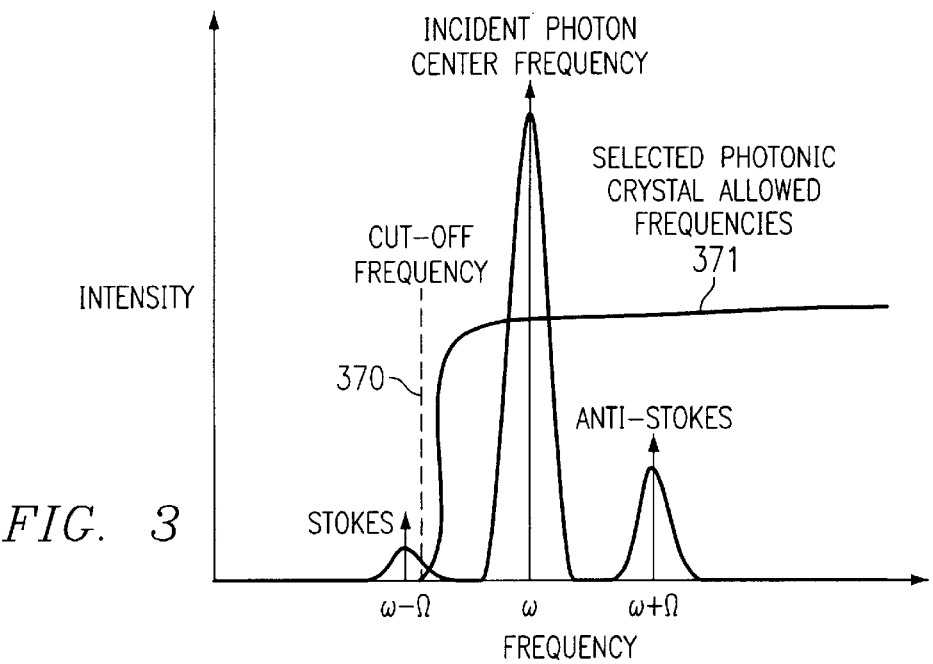
FIG. 3 depicts a graph illustrating intensity of scattered light in Raman scattering from a photonic crystal in accordance with a preferred embodiment of the present invention.

However, if Raman scattering is performed on a selected photonic crystal and the incident photon frequency is chosen appropriately, the intensity of the anti-Stoke's line can be made greater than the Stoke's line, as depicted in FIG. 3. Thus, heat energy is transferred from phonons in the crystal to photons which propagate through the photonic crystal microheatpipe to a location more suitable for heat dissipation. An appropriate choice of the incident photon center frequency $\omega$ is one close to, but above, the cut-off frequency 370 where the cut-off frequency represents on side of a bandpass of allowable frequencies 371 of the filter characterized by the selected photonic crystal. That combination results in the frequency of the Stoke's line being placed within the area of frequencies that are filtered out or disallowed by the photonic crystal. Depending on the choice of incident frequency and, thus, the resulting placement of the Stoke's line, the Stoke's effect may be merely minimized, as depicted in FIG. 3, or may be entirely eliminated, depending upon whether the frequency of the Stoke's line is completely within the disallowed frequency range of the photonic crystal or whether the Stoke's line overlaps.

Raman scattering is well known in the art. More information about Raman scattering and the Raman effect may be found in Kittel, C., *Introduction to Solid State Physics*, 7th Edition, John Wiley and Sons, Inc., New York, (1996), pp. 306, 322, which is hereby incorporated herein for all purposes.

Figure 4A:
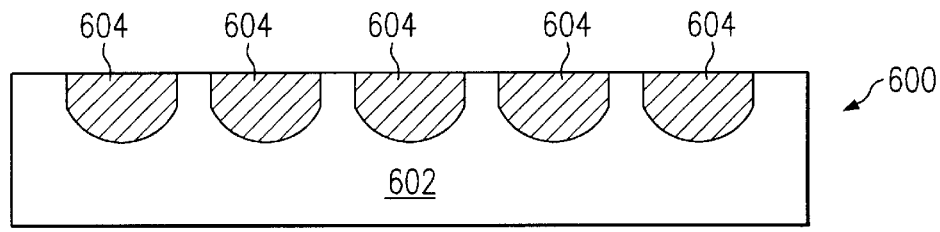
FIGS. 4A–4B are cross-sectional and top view diagrams illustrating the concept of photonic crystals in accordance with the present invention.
Figure 4B:
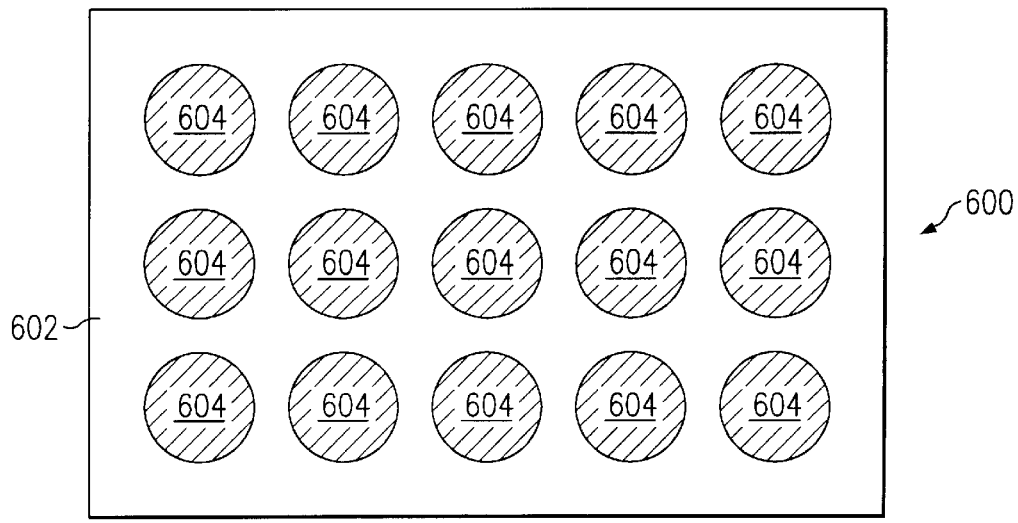

With reference now to FIGS. 4A–4B, cross-sectional and top view diagrams illustrating the concept of photonic crystals are depicted in accordance with the present invention. Photonic crystal 600 comprises a first material 602 having a given index of refraction for light and an array of a second material 604 situated within the first material 602 in a periodic manner. The second material 604 has a different index of refraction for light than the index of refraction for light of the first material 602. In its most simple and elementary terms, the property of photonic crystals that disallows certain frequencies or wavelengths of light is explained by this periodic array of material 604 with a different index of refraction for light than the index of refraction of light in the material 602 in which the periodic array of material 604 is imbedded.

Photonic crystal construction and properties are well known in the art. A more detailed explanation of and description of methods of constructing photonic crystals may be found in the following references which are hereby incorporated herein by reference for all purposes. Grüning et al., "Macroporous silicon with a complete two-dimensional photonic band gap centered at 5 μm," *Appl, Phys. Lett.*, Vol. 68, No, 6, Feb. 5, 1996; Leonard et al., "Single-mode transmission in two-dimensional macroporous silicon photonic crystal waveguides," *Optics Letters*, Vol. 25, No. 20, Oct. 15, 2000; and Pentry, J. B., "Photonic gap materials," *Current Science*, Vol. 76, No. 10, May 25, 1999.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A heatpipe, comprising:

a photonic crystal having a photon bandpass filter characteristic with a cut-off frequency;

a photon source located distant from the photonic crystal providing photons to the photonic crystal at a center frequency which locates the cut-off frequency of the photonic crystal between the center frequency and a Stoke's line frequency; and a distant photon heat sink for photons scattered by the photonic crystal.

2. The heatpipe as recited in claim 1, wherein the heatpipe is a two dimensional photonic crystal.

3. The heatpipe as recited in claim 1, wherein the heatpipe is a two-and-a-half dimensional photonic crystal.

4. The heatpipe as recited in claim 1, wherein the heatpipe is a three dimensional photonic crystal.

5. A heat transfer apparatus; comprising:

a hot plate;

a photonic crystal, having a photon bandpass filter characteristic with a cut-off frequency, in thermal contact with the hot plate;

a photon source located distant from the photonic crystal providing photons to the photonic crystal at a center frequency which locates the cut-off frequency of the photonic crystal between the center frequency and a Stoke's line frequency; and a distant photon heat sink for photons scattered by the photonic crystal.

6. The heat transfer apparatus as recited in claim 5, wherein the heatpipe is a two dimensional photonic crystal.

7. The heat transfer apparatus as recited in claim 5, wherein the heatpipe is a two-and-a-half dimensional photonic crystal.

8. The heat transfer apparatus as recited in claim 5, wherein the heatpipe is a three dimensional photonic crystal.

9. The heat transfer apparatus as recited in claim 5, wherein the hot plate is thermally coupled to a thermoelectric cooler.

10. A data processing system, comprising:

a component;

a cooling device having a cold plate thermally coupled to the component and a hot plate;

a photonic crystal having a proximal end thermally coupled to the hot plate and a distal end, wherein the photonic crystal has a photon bandpass filter characteristic with a cut-off frequency;

a photon source located distant from the photonic crystal providing photons to the photonic crystal at a center frequency which locates the cut-off frequency of the photonic crystal between the center frequency and a Stoke's line frequency; and a distant photon heat sink for photons scattered by the photonic crystal.

11. The data processing system as recited in claim 10, wherein the cooling device is a thermoelectric cooler.

12. The data processing system as recited in claim 10, wherein the photonic crystal is a two dimensional photonic crystal.

13. The data processing system as recited in claim 10, wherein the photonic crystal is a two-and-a-half dimensional photonic crystal.

14. The data processing system as recited in claim 10, wherein the photonic crystal is a three dimensional photonic crystal.

15. The data processing system as recited in claim 10, wherein the component is a processor.

16. The data processing system as recited in claim 10, wherein the component is a radio frequency circuit.

* * * * *